United States Patent
Kanesaka et al.

(10) Patent No.: US 6,825,830 B1
(45) Date of Patent: Nov. 30, 2004

(54) INFORMATION PROCESSING SYSTEM, INFORMATION PROCESSING METHOD, AND COMPUTER-READABLE RECORDING MEDIUM FOR EXECUTING INFORMATION PROCESSING METHOD ON A COMPUTER

(75) Inventors: Toshiya Kanesaka, Chiba (JP); Haruo Hashimoto, Chiba (JP); Masahiro Noguchi, Chiba (JP); Tomozumi Saruwatari, Chiba (JP); Takashi Ito, Chiba (JP); Hiroshi Odagiri, Chiba (JP)

(73) Assignee: Seiko Instruments Inc., Chiba (JP)

( * ) Notice: Subject to any disclaimer, the term of this patent is extended or adjusted under 35 U.S.C. 154(b) by 153 days.

(21) Appl. No.: 09/712,574

(22) Filed: Nov. 14, 2000

(30) Foreign Application Priority Data

Dec. 13, 1999 (JP) .......................................... 11-353564

(51) Int. Cl.[7] ................................................. G09G 5/00
(52) U.S. Cl. ...................... 345/156; 345/158; 455/555; 455/556.1
(58) Field of Search ................................. 345/156, 157, 345/158, 168, 169, 204, 205, 1.2, 2.1, 2.3; 455/553, 555, 556.1, 554, 556

(56) References Cited

U.S. PATENT DOCUMENTS

| | | | | |
|---|---|---|---|---|
| 5,617,102 A | * | 4/1997 | Prater | .......................... 342/374 |
| 5,724,647 A | * | 3/1998 | Sato | .......................... 455/552.1 |
| 5,960,366 A | * | 9/1999 | Duwaer | ........................ 455/556 |
| 6,104,334 A | * | 8/2000 | Allport | .......................... 341/175 |
| 6,219,553 B1 | * | 4/2001 | Panasik | ....................... 455/446 |
| 6,278,442 B1 | * | 8/2001 | Griffin et al. | ................ 345/156 |
| 6,282,435 B1 | * | 8/2001 | Wagner et al. | ............... 455/566 |

FOREIGN PATENT DOCUMENTS

| | | | |
|---|---|---|---|
| DE | 19749730 | 5/1999 | |
| EP | 0327834 | 8/1989 | |
| GB | 2149554 A | * 6/1985 | ............. G09F/9/35 |
| GB | 2289555 A | * 11/1995 | ............. G06F/3/00 |
| WO | 88008649 | 11/1988 | |

* cited by examiner

Primary Examiner—Bipin Shalwala
Assistant Examiner—Mansour M. Said
(74) Attorney, Agent, or Firm—Adams & Wilks

(57) ABSTRACT

An information processing system has a first information processing device having a first wireless communicator for receiving and sending data information from and to a base station by wireless communication and a display for displaying first level information. A second information processing device has a second wireless communicator for receiving and sending data information from and to the first information processing device by wireless communication and a display for displaying second level information corresponding to a sub-level of the first level information displayed by the display of the first information processing device.

10 Claims, 6 Drawing Sheets

INFORMATION PROCESSING SYSTEM, INFORMATION PROCESSING METHOD, AND COMPUTER-READABLE RECORDING MEDIUM FOR EXECUTING INFORMATION PROCESSING METHOD ON A COMPUTER

BACKGROUND OF THE INVENTION

1. Field of the Invention

This invention relates to an information processing device equipped with a communication function such as a portable telephone, or portable information processing terminal etc., an information processing method, and a computer-readable recording medium containing a program for executing the information processing method on a computer.

2. Description of the Prior Art

In recent years, portable information processing devices equipped with communications functions such as a portable telephone or a mobile computer etc. have become widespread, and can be easily carried by a user while on the move so that communication using this information processing device is possible anywhere. Portable telephones, in particular, are required to be both compact and lightweight, and are expected to fulfill the role of a communications tool for handling various information such as e-mail etc. in addition to handling conversations.

With portable telephones, conversation takes place with part (the speaker portion) of the portable telephone in contact with a persons ear. It is therefore difficult to look at a display screen, which is usually located in the vicinity of the speaker portion, during a conversation. This gives rise to the problem that telephone numbers and other information stored in the portable telephone cannot be displayed at the display screen and the contents of the display screen cannot be confirmed while a conversation is taking place.

As it is necessary for the portable telephone to be small, the display screen for displaying information is by necessity small, and the amount of information that can be displayed at one time is therefore limited. In particular, when a large amount of information, or hierarchical information is viewed at the display screen of a portable telephone, it is necessary to change the contents displayed at the screen every time, with this operation being especially complex.

In order to resolve the problems of the related art described above, it is the object of the present invention to provide an information processing device, information processing method, and computer-readable recording medium containing a program for executing the information processing method on a computer capable of improving user friendliness when confirming the content of a display displayed by the information processing device.

SUMMARY OF THE INVENTION

In order to resolve the aforementioned problems and achieve the aforementioned object, an information processing device of the present invention comprises display means for displaying characters, symbols, and images, wireless communication means for receiving data from another information processing device by wireless communication, and display control means for controlling the display controller and displaying the same content as part of or the whole of content displayed at a display screen of another information processing device based on data received by the wireless communication means.

According to the present invention, the content displayed can be easily confirmed even when the display screen of the other information processing device cannot be seen or is difficult to see.

With the information processing device of the present invention, content displayed by the display means can be information relating to the remaining charge of a battery of the other information processing device.

According to the present invention, the charge remaining for a battery of the other information processing device can be easily confirmed even when the display screen of the other information processing device cannot be seen or is difficult to see.

With the information processing device of the present invention, content displayed by the display means can be information relating to a communication state while the other information processing device communicates with an external device.

According to the present invention, a communication state (radio sensitivity) of the other information processing device can be easily confirmed even when the display screen of the other information processing device cannot be seen or is difficult to see.

Further, an information processing device of the present invention comprises display means for displaying characters, symbols, and images, wireless communication means for receiving data from another information processing device by wireless communication, and display control means for controlling the display controller and displaying content, differing to content displayed at a display screen of another information processing device, and content relating to the content displayed at the display screen of the other information processing device, based on data received by the wireless communication means.

According to the present invention, display content displayed at the display screen of the other information processing device and content relating to this display content can be viewed at the same time.

Moreover, with the information processing device of the present invention, content displayed by the display means is content relating to information present at a lower level to the level of the content displayed at the display screen of the other information processing device.

According to the present invention, display content displayed at the display screen of the other information processing device and content of a lower level of this displayed content can be viewed at the same time.

Further, an information processing device of the present invention can be worn on a person's arm.

According to the present invention, portability is easily achieved and a person can view the display screen simply by lifting their arm.

An information processing method of the present invention comprises the steps of receiving data from another information processing device, and displaying the same content as part of or the whole of content displayed at a display screen of the other information processing device based on data received in the receiving step.

According to the present invention, the content displayed can be easily confirmed even when the display screen of the other information processing device cannot be seen or is difficult to see.

Still further, an information processing method of the present invention comprises the steps of receiving data from another information processing device, and displaying content, differing to content displayed at a display screen of the other information processing device, and content relating to the content displayed at the display screen of the other information processing device, based on data received in the receiving step.

According to the present invention, display content displayed at the display screen of the other information processing device and content relating to this display content can be viewed at the same time.

Moreover, with the information processing method of the present invention, content displayed in the display step is content relating to information present at a lower hierarchical layer of the content displayed at the display screen of the other information processing device.

According to the present invention, display content displayed at the display screen of the other information processing device and content of a lower hierarchical layer of this displayed content can be viewed at the same time.

Moreover, a computer-readable recording medium of the present invention is recorded with a program for executing the method on a computer.

According to the present invention, by recording a program executable by a computer, this program can be read by a machine and the method can therefore be implemented by a computer.

According to the present invention, an information processing device comprises a display to display characters, symbols, and images, a wireless communication equipment to receive data from another information processing device by wireless communication, and a display controller to control the display and to display the same content as part of or the whole of content displayed at a display screen of another information processing device based on data received by the wireless communication equipment.

According to the present invention, an information processing device comprises a display to display characters, symbols, and images, a wireless communication equipment to receive data from another information processing device by wireless communication and a display controller to control the display and to display content, differing to content displayed at a display screen of another information processing device, and content relating to the content displayed at the display screen of the other information processing device, based on data received by the wireless communication equipment.

BRIEF DESCRIPTION OF THE DRAWINGS

A preferred form of the present invention is illustrated in the accompanying drawings in which.

DETAILED DESCRIPTION OF THE PREFERRED EMBODIMENTS

The following is a detailed description, with reference to the appended drawings, of an information processing device, an information processing method, and a computer-readable recording medium recorded with a program for executing the information processing method on a computer according to the present invention.

Figure 1:
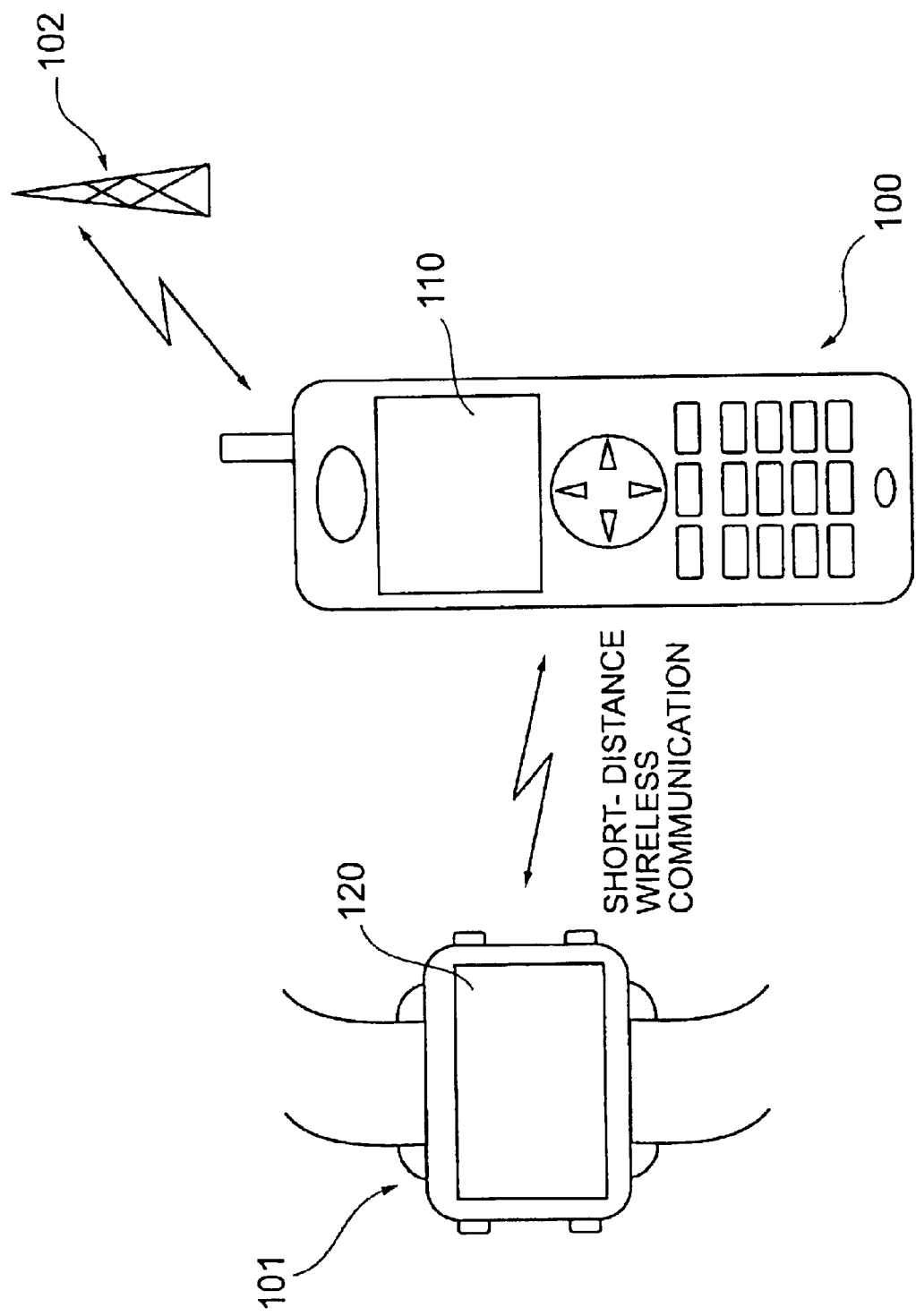
FIG. 1 is a view illustrating an example configuration of an information processing system including an information processing device of this embodiment.

FIG. 1 is a view illustrating an example configuration of an information processing system including an information processing device of this embodiment. In FIG. 1, the information processing system comprises a first information processing device (portable telephone) 100, a second information processing device (wristwatch-type information processing device) 101, and a relay station (base station) 102 communicating with the first information processing device (portable telephone) 100.

The first information processing device (portable telephone) 100 is an information processing device capable of performing either bi-directional or mono-directional communications with other portable telephones, PHS, mobile personal computers, pocket beepers, etc., and the relay station (base station) 102. The content of communication with the relay station (base station) 102 for a portable telephone etc. can be implemented using the related art and a detailed description is therefore omitted. Further, a display of the first information processing device (portable telephone) 100 is equipped with a display screen 110 for displaying the various character, symbol and image information.

The second information processing device (wristwatch-type information processing device) 101 does not communicate with the relay station (base station) 102 but does perform short distance wireless communication with the first information processing device (portable telephone) 100, and is a device in itself. The second information processing device 101 of this embodiment is a wristwatch type information processing device and is normally worn on an owners (users) arm. In this way, it can then be determined whether or not the distance between the owner (user) and the first information processing device 100 is a distance where short distance wireless communication is possible.

Further, a display of the second information processing device (wristwatch-type information processing device) 101 is equipped with a display screen 120 for displaying the various character, symbol and image information. The second information processing device 101 is by no means limited to a wristwatch type information processing device, and can be any type of information processing device that can normally be carried by the owner (user) of the first information processing device, such as, for example, a pendent type device hanging from a person's neck or a device worn on a person's clothing.

For example, "Bluetooth" can be employed as the short distance wireless communication technology for communication between the first information processing device (portable telephone) 100 and the second Information processing device (wristwatch-type information processing device) 101. With "Bluetooth", the frequency band is 2.45 GHz, the range within which a connection can be made is 10 m, and the transfer rate is 1 Mbps. Various equipment such as portable telephones, portable personal computers and peripheral equipment etc. can then be connected if a port conforms to "Bluetooth".

Information Processing Device Configuration.

Figure 2:
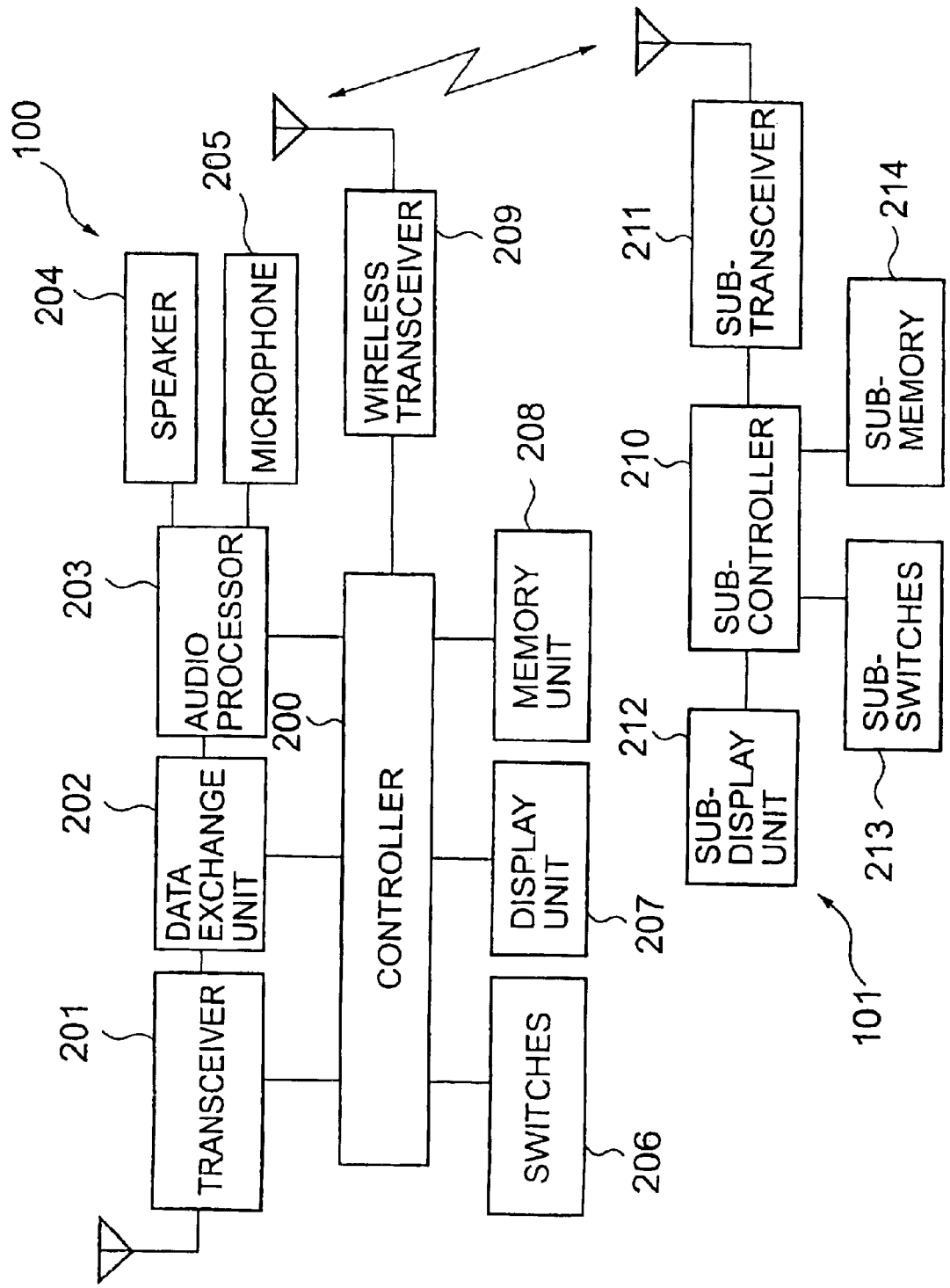
FIG. 2 is a block diagram showing an example hardware configuration for the information processing devices (portable telephone and wristwatch type information processing device) of this embodiment.

Next, a description is given of the hardware configuration of the first information processing device (portable telephone) 100 and the second information processing device (wristwatch-type information processing device) 101. FIG. 2 is a block diagram showing an example hardware configuration for the first and second information processing devices (portable telephone and wristwatch type information processing device) of this embodiment.

In the block diagram of FIG. 2, the first information processing device (portable telephone) 100 comprises a controller 200, a transceiver 201, a data exchange unit 202, an audio processor 203, a speaker 204, a microphone 205, switches 206, a display unit 207, a memory unit 208, and a wireless transceiver 209.

The controller 200 consists of, for example, a CPU etc., and controls the device as a whole. The transceiver 201 consists of a communication unit or modem, etc., and communicates with the relay station (base station) 102. Further, the data exchange unit 202 converts data received from the transceiver 201 into data capable of being subjected to audio processing by the audio processor 203 and conversely converts data having undergone audio processing at the audio processor 203 into data capable of being transmitted by the transceiver 201.

The audio processor 203 also converts data sent from the data exchange unit 202 into audio data capable of being outputted from the speaker 204 and alternatively converts audio inputted from the microphone 205 into data for transmission to the data exchange unit 202. The speaker 204 is for outputting audio and the microphone 205 is for inputting audio.

The switches 206 are for carrying out various operations with respect to the information processing device and consist of, for example, a keyboard, or touch-sensitive panel, etc, and consist of a numeric key pad and power switch, etc. in the case of a portable telephone. The display unit 207 is a TFT liquid crystal display etc., and displays operation content and operation results etc., at the display screen 110 shown in FIG. 1.

The memory unit 208 consists of various ROM and RAM, etc., and stores programs executed by the controller 200 and various data (including telephone book data in the case of a portable telephone). The wireless transceiver 209 administers communication with the second information processing device (wristwatch-type information processing device) 101.

The functions of each of the transceiver 201, data exchange unit 202, audio processor 203 and wireless transceiver 209 are implemented by the execution of instruction processing by the controller 200 in accordance with instructions described in programs recorded on recording media of the memory unit 208, etc.

The second information processing device (wristwatch-type information processing device) 101 comprises a sub-controller 210, sub-transceiver 211, sub-display unit 212, sub-switches 213 and sub-memory 214.

The controller 210 consists of, for example, a microprocessor of a CPU etc., and controls the entire sub-unit. The wireless transceiver 211 administers communication with the first information processing device 100, i.e. receives data from the portable telephone 100 via wireless communication. The functions of each part of the transceiver 211 are implemented by the execution of instruction processing by the sub-controller 210 in accordance with instructions described in programs recorded on recording media of the sub-memory 214, etc.

The sub-display unit 212 is constituted by a display screen 120 of the display of the wristwatch-type information processing device 101 shown in FIG. 1 and as well as showing the time, shows the state of communication with the first information processing device (portable telephone) 100 and displays operation content and results of operations, etc. The sub-switches 213 consists of switches etc. (not shown) provided at a side surface or upper surface of the wristwatch-type information processing device 101 and carry out various operations with respect to the sub-unit. The sub-memory 214 consists of various ROM and RAM, etc., and stores programs executed by the sub-controller 210 and various data.

The sub-controller 210 controls displaying at the sub-display unit 212, i.e. the same content as part of or the whole of content displayed at the display unit 207 (display screen 110) is displayed at the sub-display unit 212 (display screen 120) based on data received from the sub-transceiver 211. The sub-controller 210 also displays content differing from the content displayed at the display unit 207 (display screen 110) of the portable telephone 100 but relating to the content displayed at the display unit 207 (display screen 110) of the portable telephone 100 at the sub-display unit 212 (display screen 120). Information processing device processing procedure.

Figure 3:
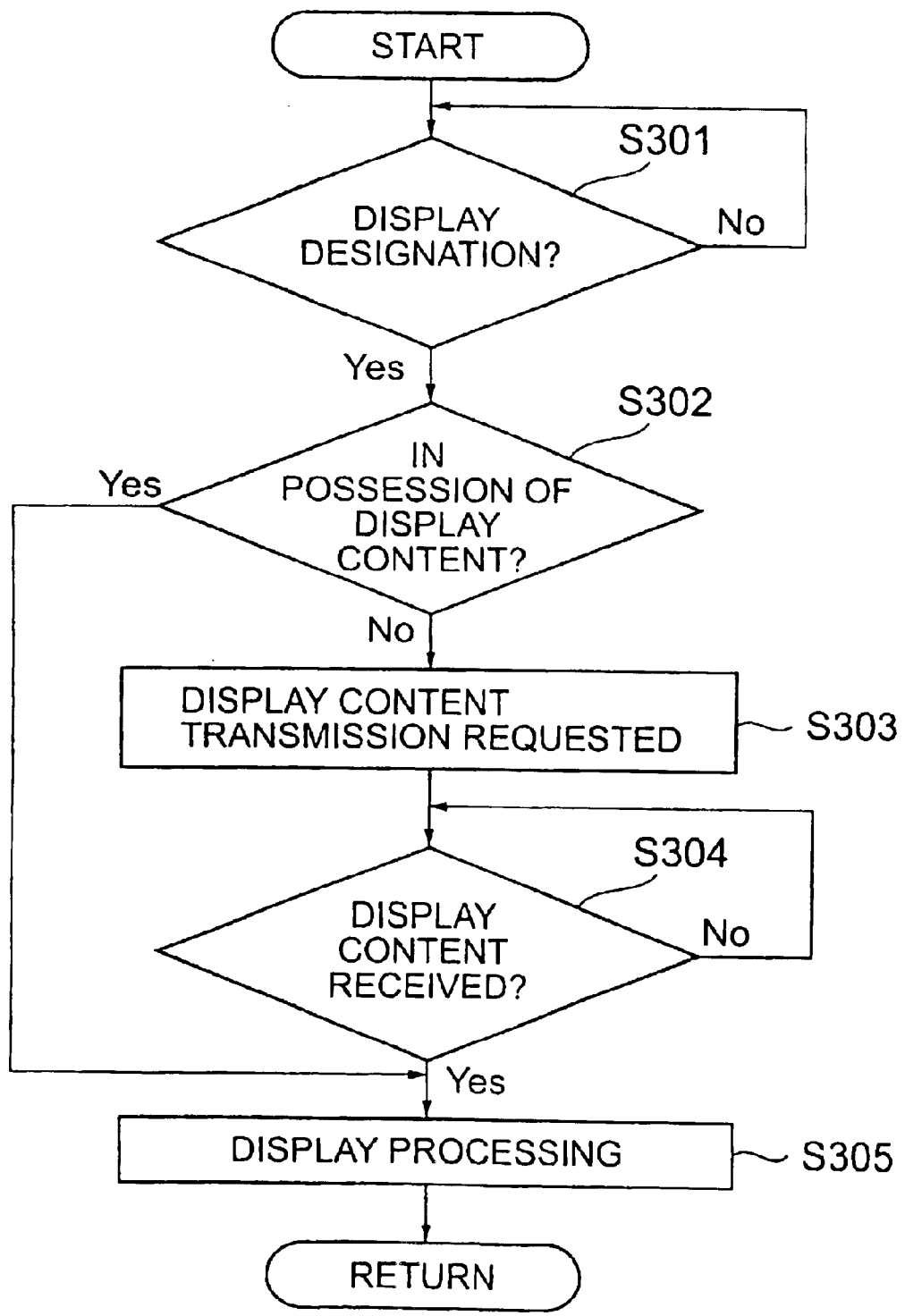
FIG. 3 is a flowchart showing an example of a processing procedure for information processing devices of this embodiment.

FIG. 3 is a flowchart showing an example of a processing procedure of an information processing device of this embodiment. In FIG. 3, first, a determination is made (step S301) as to whether or not there has been a display designation in order to display content at the display screen 120 of the second information processing device (wristwatch-type information processing device) 101 shown in FIG. 1. This display designation can be a designation inputted via the sub-controller 210 of the wristwatch-type information processing device 101 shown in FIG. 2 or can be a designation received by the sub-transceiver 211 inputted via the switches 206 of the first information processing device (portable telephone) 100.

In step S301, a display designation is waited for and when there is a display designation (when step S301 is affirmative), it is then determined whether the display content designated in step S301 is held, i.e. a determination is made as to whether or not this display content is already stored in the sub-memory 214 (step S302). When this content is already held (when step S302 is affirmative) step S305 is proceeded to.

On the other hand, in step S302, when there is no display content held (step 302 is NO), a request is made to the portable telephone 100 to send this display content (step S303). After this, it is determined whether or not the display content the transmission of which was requested in step S302 has been received (step S304). Receipt is awaited, and when received (when step S304 is affirmative), step S305 is proceeded to. Then, in step S305, the display content is displayed at the display screen 120 (step S305), the successive processes are complete, and the state of step S301 is returned to.

Display Screen Content.

Next, a description is given of the content of the display screen. FIG. 4 to FIG. 7 are views illustrating the display content of the display screen 110 of the first information processing device (portable telephone) 100 and the display screen 120 of the second information processing device (wristwatch-type information processing device) 101.

Figure 4:
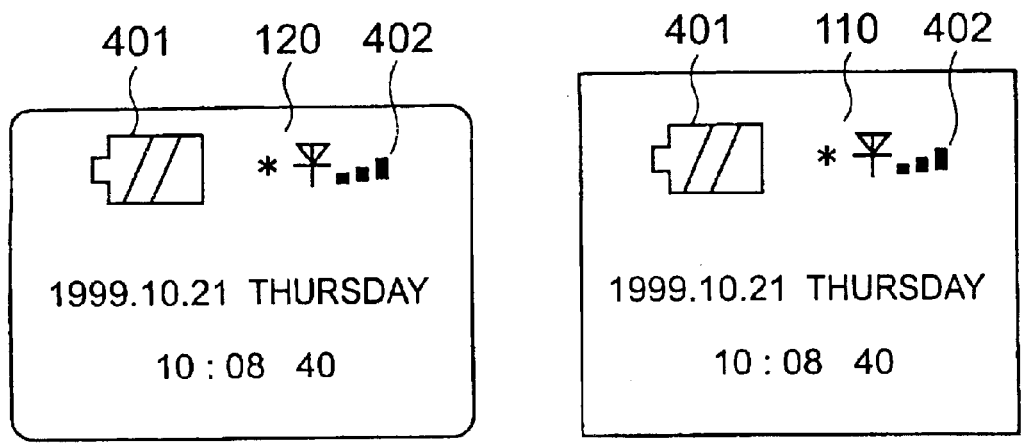
FIG. 4 is a view illustrating content of display screens of the information processing devices (portable telephone and wristwatch type information processing device) of this embodiment.

In FIG. 4, a battery symbol 401 of a battery-type figure indicating the remaining battery charge, an antenna symbol 402 of an antenna-type figure indicating the communication state, i.e. the radio sensitivity, and the date, day and time are displayed at the display screen 110 of the portable telephone 100. The same content as is displayed at the display screen 110 of the portable telephone 100 (battery symbol 401, antenna symbol 402, current date, day and time) is also displayed at the display screen 120 of the wristwatch-type information processing device 101.

In a mode for displaying the same content, the content of the display screen 110 of the portable telephone 100 and the content of the display screen 120 of the wristwatch-type information processing device 101 are the same. The content of the display screen 110 of the portable telephone 100 can therefore be identified by looking at the display screen 120 of the wristwatch-type information processing device 101 even when the display screen 110 of the portable telephone 100 cannot be seen. For example, the content of the display screen 110 can be confirmed by looking at the display screen 120 of the wristwatch-type information processing device 101 when the portable telephone 100 is in a bag or the like without taking the portable telephone 100 out of the bag, etc.

The display screen 110 of the portable telephone 100 is usually located close to the speaker 204 and it has therefore been extremely difficult to view the content displayed at the display screen 110 while the person using the telephone is talking with the speaker 204 of the portable telephone next to their ear. However, here, the content displayed at the display screen 110 of the portable telephone 100 can be confirmed during a conversation by displaying the same content as the content displayed at the display screen 110 at the display screen 120 of the wristwatch-type information processing device 101 and looking at the display screen 120.

This is particularly useful for telling people about data such as telephone numbers etc. stored in the portable telephone 100 during a conversation. A person can therefore inform someone of data in a more accurate manner because the problem of having to take the speaker away from your ear in order to confirm the display content of the display screen 110 and the put the speaker back next to your ear again is resolved and a conversation can take place while looking at the display content.

Figure 5:
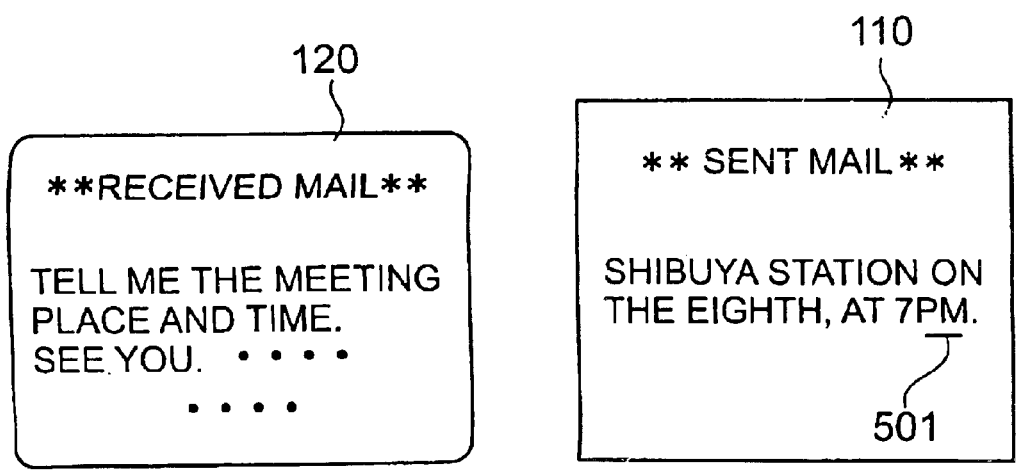
FIG. 5 is a view illustrating content of further display screens of the information processing devices (portable telephone and wristwatch type information processing device) of this embodiment.

In FIG. 5, the content of a received mail message is displayed at the display screen 120 of the wristwatch-type information processing device 101 and the content of a sent mail message is displayed at the display screen 110 of the portable telephone 100. Here, a cursor 501 is displayed while a mail message to be sent is being made. Here, different content is displayed at each screen, but both can be viewed simultaneously by displaying content relating to both, i.e. a received mail message is displayed at the display screen 120 of the wristwatch-type information processing device 101 and a mail message to be sent (a reply) can be easily made in line with the content of the received mailmessage while looking at the content of the received mail message.

Figure 6:
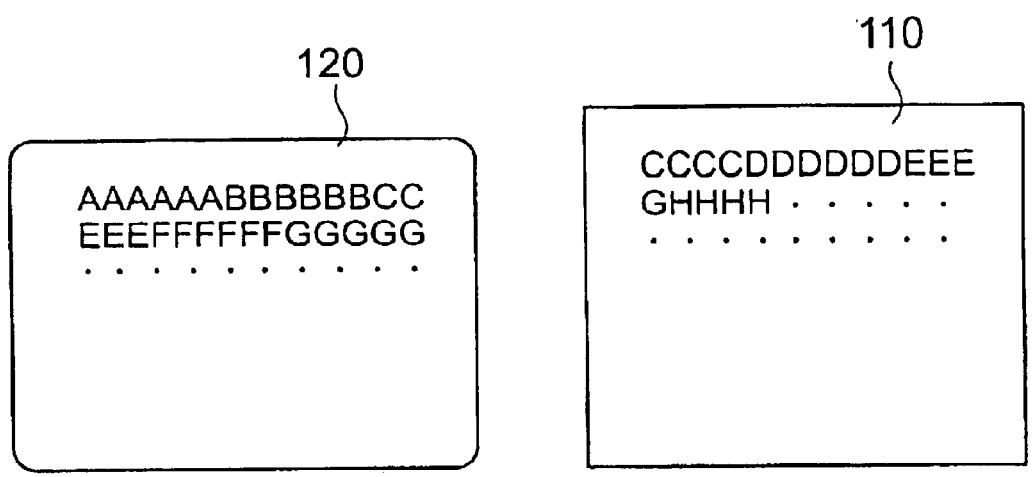
FIG. 6 is a view illustrating content of still further display screens of the information processing devices (portable telephone and wristwatch type information processing device) of this embodiment.
Figure 7:
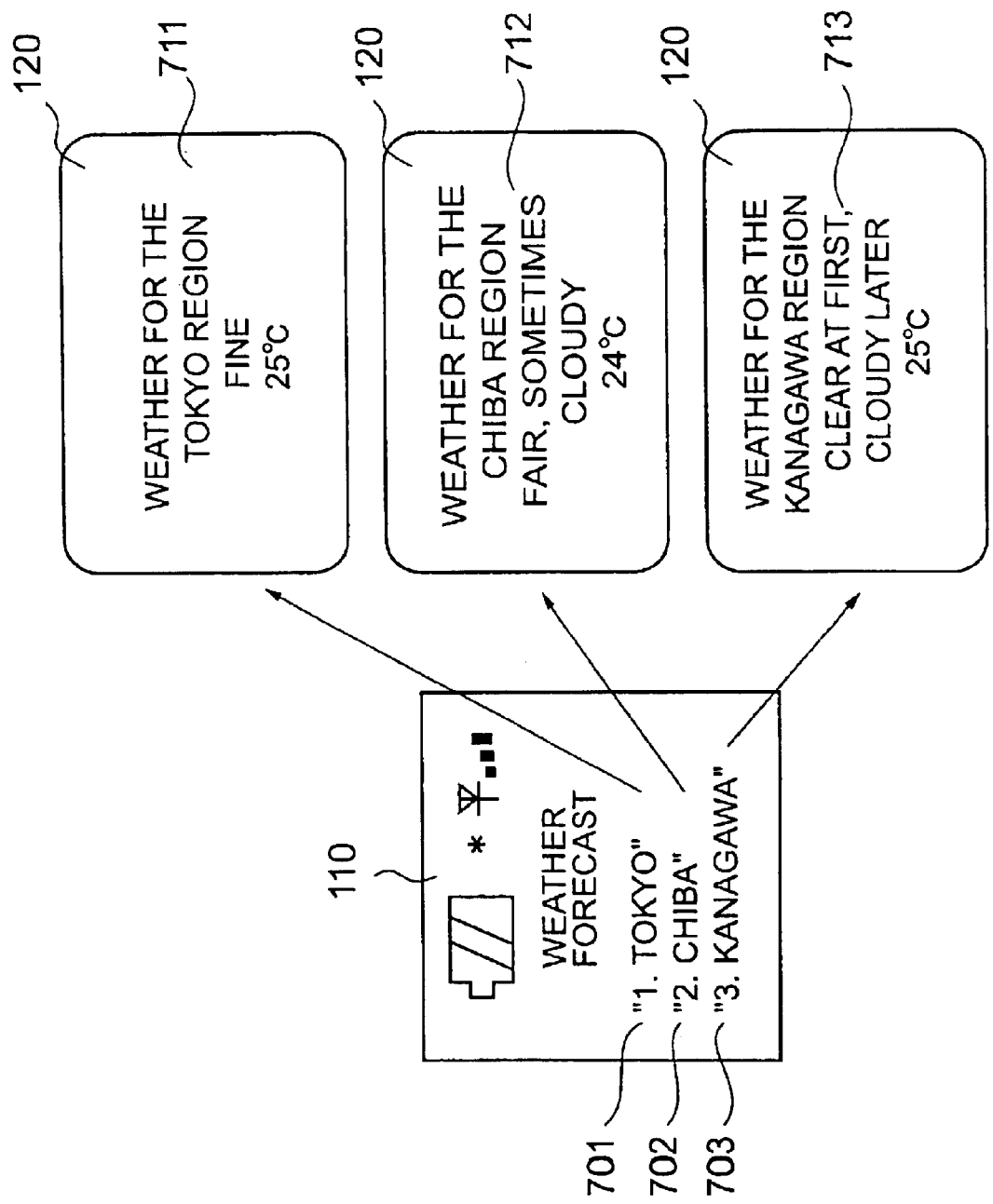
FIG. 7 is a view illustrating content of other display screens of the information processing devices (portable telephone and wristwatch type information processing device) of this embodiment.

In FIG. 6, the content displayed at the display screen 110 of the portable telephone 100 and the content displayed at the display screen 120 of the wristwatch-type information processing device 101 are connected so that by displaying content as if there was just one screen, the content can be made easy to see either without large amounts of data having to be split-up or continued.

It is also possible to display information present at a lower level of the content displayed at the display screen 110 of the portable telephone 100 at the display screen 120 of the wristwatch-type information processing device 101. For example, in FIG. 7, a title of "weather forecast" is displayed at the display screen 110 together with regions of "1. Tokyo" 701, "2. Chiba" 702, and "3. Kanagawa" 703. The content of the weather forecast for each region is then displayed at the 120.

Specifically, information of "Weather for the Tokyo region: Fine, 25° C." 711 present at a lower layer is displayed for "1. Tokyo" 701, "Weather for the Chiba region: fair, sometimes cloudy 24° C." 712 is similarly displayed for "2. Chiba" 702, and "Weather for the Kanagawa region: Clear at first, cloudy later 25° C." 713 is displayed for "3. Kanagawa" 703.

Information existing at a lower layer can therefore be displayed at the display screen 120 by selecting prescribed information at the display screen 110 and information existing at corresponding lower layers can also be displayed at the display screen 120 for other information displayed at the display screen 110 by making selections using a cursor (not shown).

As described above, according to this embodiment, the sub-transceiver 211 receives data from the portable telephone 100 via wireless communication. The sub-controller 210 controls the sub-display unit 212, and the same content as part or all of the content displayed at the display screen 110 of the portable telephone 100 is displayed at the display screen 120 based on the data received by the sub-transceiver 211. Display content can therefore easily be confirmed even when the display screen 110 of the portable telephone 100 cannot be seen which improves usefulness for a user while confirming displayed content.

Further, according to this embodiment, content displayed at the display screen 120 is information relating to the amount of charge remaining in the battery of the portable telephone 100, i.e. the battery symbol 401. The charge remaining for the battery of the portable telephone 100 can therefore be confirmed even when it is difficult to see the display screen 110 of the portable telephone 100.

Further, according to this embodiment, displayed content is information relating to the state of communication (radio sensitivity) while the portable telephone 100 communicates with the base station 102. The state of communication (radio sensitivity) of the portable telephone 100 can therefore be identified even when the display screen 110 of the portable telephone 100 cannot be seen.

As described above, according to this embodiment, the sub-transceiver 211 receives data from the portable telephone 100 via wireless communication. The sub-controller 210 controls the sub-display unit 212, and data differing from but also relating to content displayed at the display screen 110 of the portable telephone 100 is displayed based on the data received by the sub-transceiver 211. Content relating to this displayed content can therefore be viewed simultaneously when content is displayed at the display screen 110 of the portable telephone 100.

According to this embodiment, displayed content is content relating to information existing at a lower layer of content displayed at the display screen 110 of the portable telephone 100. The content displayed at the portable telephone 100 and content at a lower level to this displayed content can therefore be viewed simultaneously.

According to this embodiment, this information processing device can be worn on a persons arm and can therefore easily be carried about, and the content of the display screen can be viewed simply by a person raising their arm.

The information processing method for the embodiment described above can be implemented by executing a previously prepared program. This program is recorded on a computer-readable recording medium such as a hard disc, floppy disc, CD-ROM, MO or DVD etc., and is executed by being read from the recording medium by the information processing device. This program can be distributed via the aforementioned recording medium or as a medium transmitted via a network such as the internet, etc.

As described above, according to the present invention, data transmitted via wireless communication from another information processing device is received, and content which is completely or partially the same as content displayed at the display screen of the other information processing device is displayed based on the received data. The display content can therefore easily be confirmed even when it is impossible or difficult to view the display screen of the other information processing device. This makes the information processing device much more convenient for the user while displayed content is being confirmed.

According to the present invention, content displayed by the display means can be information relating to remaining charge of a battery of the other information processing device. Charge remaining for a battery of the other information processing device can be easily confirmed even when the display screen of the other information processing device cannot be seen or is difficult to see. This gives an information processing device which is much more convenient for the user when identifying displayed content.

According to the present invention, content displayed can be information relating to a communication state while the other information processing device communicates with an external device. The communication state (radio sensitivity) of the other information processing device can therefore be easily confirmed even when the display screen of the other information processing device cannot be seen or is difficult to see. This gives an information processing device which is much more convenient for the user when identifying displayed content.

Further, according to the present invention, data is received from the other information processing device via wireless communication, and content differing from but relating to content displayed at the display screen of the other information processing device is displayed based on the received data. Display content displayed at the display screen of the other information processing device and content relating to this display content can therefore be viewed at the same time. This gives an information processing device which is much more convenient for the user when identifying displayed content.

Moreover, according to the present invention, the displayed content can be content relating to information present at a lower level of the content displayed at the display screen of the other information processing device. Content displayed at the display screen of the other information processing device and content of a lower hierarchical layer of this displayed content can therefore be viewed at the same time. This gives an information processing device which is much more convenient for the user when identifying displayed content.

According to the present invention, this information processing device can be worn on a persons arm and can therefore easily be carried about, and the content of the display screen can be viewed simply by a person raising their arm. This gives an information processing device which is much more convenient for the user when identifying displayed content.

Further, according to the present invention, data is received from the other information processing device via wireless communication, and content that is either completely or partially the same as content displayed at the display screen of the other information processing device is displayed based on the received data. The content displayed can therefore easily be confirmed even when the display screen of the other information processing device cannot be seen or is difficult to see. This gives an information processing method which is much more convenient for the user when identifying displayed content.

Further, according to the present invention, data is received from the other information processing device, and content differing from but relating to content displayed at the display screen of the other information processing device is displayed based on the received data. Display content displayed at the display screen of the other information processing device and content relating to this display content can therefore be viewed at the same time. This gives an information processing method which is much more convenient for the user when identifying displayed content.

Moreover, according to the present invention, the displayed content can be content relating to information present at a lower level of the content displayed at the display screen of the other information processing device. Content displayed at the display screen of the other information processing device and content of a lower hierarchical layer of this displayed content can therefore be viewed at the same time. This gives an information processing method which is much more convenient for the user when identifying displayed content.

According to the present invention, this method can be recorded as a program executable by a computer. This program can be read by machine and as a result a recording medium capable of implementing this method by computer can be provided.

What is claimed is:

1. An information processing method, comprising the steps of:
   providing a first information processing device having a first wireless communicator for receiving and sending data information from and to a base station by wireless communication and a first display for displaying the data information as first level information;
   providing a second information processing device having a second wireless communicator and a second display; and
   operating the second information processing device so that the second wireless communicator receives and sends data information from and to the first information processing device by wireless communication and the second display displays second level information corresponding to a sub-level of the first level information.

2. An information processing system comprising:
   a first information processing device having a first wireless communicator for receiving and sending data information from and to a base station by wireless communication and a display for displaying a first level information; and
   a second information processing device having a second wireless communicator for receiving and sending data information from and to the first information processing device by wireless communication and a display for displaying second level information corresponding to a sub-level of the first level information displayed by the display of the first information processing device.

3. An information processing system comprising:
a first information processing device having a first wireless communicator for receiving and sending data information from and to a base station by wireless communication and a display for displaying the data information; and
a second information processing device having a switch and a second wireless communicator for receiving and sending data information from and to the first information processing device by wireless communication and a display for displaying data information corresponding to the data information displayed by the display of the first information processing device, the data information displayed by the display of the second information processing device being transmitted to the first information processing device by operating the switch of the second information processing device.

4. An information processing system comprising: a first information processing device having a first wireless communicator for receiving and sending data information from and to a base station by wireless communication and a display for displaying the data information; a second information processing device having a second wireless communicator for receiving and sending data information from and to the first information processing device by wireless communication and a display for displaying information; display control means for controlling the display of the second information processing device to display data information corresponding to the data information displayed by the display of the first information processing device; input means for inputting to the second information processing device a display designation designating a display content to be displayed; display designation determination means for determining whether or not the display designation has been inputted; store determination means for determining whether or not the display content is stored in the second information processing device; transmission request means for requesting the first information processing device to transmit the display content when the display content is not stored in the second information processing device; and means for causing the display of the second information processing device to display the display content when the display content is stored in the second information processing device or when the display content is transmitted by the first information processing device.

5. An information processing system according to claim 4; wherein the input means comprises a sub-switch of the second information processing device.

6. An information processing system according to claim 4; wherein the input means comprises a switch of the first information processing device.

7. An information processing system comprising: a first information processing device having a first wireless communicator for receiving and sending data information from and to a base station by wireless communication and a display for displaying first level information corresponding to the data information; a second information processing device having a second wireless communicator for receiving and sending data information from and to the first information processing device by wireless communication and a display for displaying second level information corresponding to a sub-level of the first level information; display control means for controlling the display of the second information processing device to display data information corresponding to the first level information displayed by the display of the first information processing device; input means for inputting to the second information processing device a display designation designating a display content to be displayed; display designation determination means for determining whether or not the display designation has been inputted; store determination means for determining whether or not the display content is stored in the second information processing device; transmission request means for requesting the first information processing device to transmit the display content when the display content is not stored in the second information processing device; and means for causing the display of the second information processing device to display the display content when the display content is stored in the second information processing device or when the display content is transmitted by the first information processing device.

8. An information processing system according to claim 7; wherein the input means comprises a sub-switch of the second information processing device.

9. An information processing system according to claim 7; wherein the input means comprises a switch of the first information processing device.

10. An information processing system comprising:
a first information processing device having a first wireless communicator for communicating with a base station by short-distance wireless communication to receive and send data information from and to the base station, the first information processing device having a display for displaying first level information; and
a second information processing device having a second wireless communicator for communicating with the first wireless communicator by short-distance wireless communication to receive and send data information from and to the first wireless communicator, the second information processing device having a display for displaying second level information corresponding to a sub-level of the first level information displayed by the first information processing device when the first wireless communicator is communicating with the base station.

* * * * *